Dec. 4, 1956 W. GEHRIG Re. 24,247
COMBINED WEIGHTS AND ASSEMBLY MEMBERS
Original Filed May 3, 1949
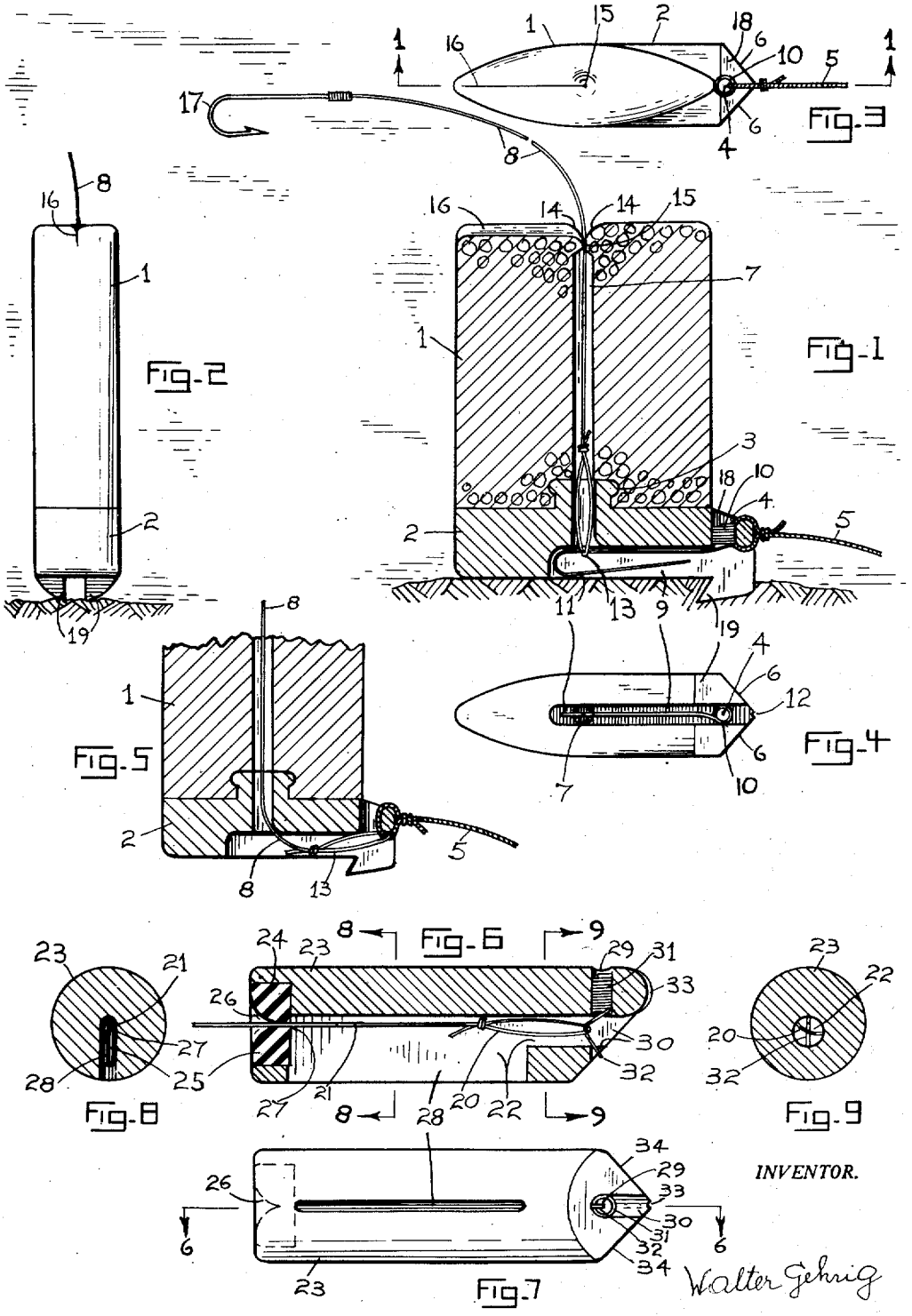
INVENTOR.
Walter Gehrig United States Patent Office Re. 24,247
Reissued Dec. 4, 1956

24,247

COMBINED WEIGHTS AND ASSEMBLY MEMBERS

Walter Gehrig, Flint, Mich.

Original No. 2,710,479, dated June 14, 1955, Serial No. 91,032, May 3, 1949. Application for reissue February 9, 1956, Serial No. 564,609

14 Claims. (Cl. 43—43.1)

Matter enclosed in heavy brackets [ ] appears in the original patent but forms no part of this reissue specification; matter printed in italics indicates the additions made by reissue.

The present invention relates to fishing tackle and the aim is to provide an improved casting weight, bobber, sinker and combined sinker and bait raiser for fishing with baited hook and line.

The invention consists essentially of a body comprising neat and convenient means to assemble a flexible hookleader with a fishing line. The device generally comprises a body perforated by a passageway for a hookleader. One end of the passageway emerges near a line-aperture for a fishing line whereby the loop-end of a hookleader which is enclosed in said passageway can be tied to the leading body-end with said fishing line or can be hooked to a leader retainer provided therefor. The other end of the passageway is formed into a curved bending form for the emerging leader portion to bend over. Means to eliminate continuous rubbing of the leader against the surface of the passageway is provided in the form of a resilient leader guard adapted to embrace and clasp a portion of the hookleader.

The body may be of buoyant or sinking material. A described combined sinker and bait-raiser has a sinker secured to the lower end of a buoyant body. The result is that the combined sinker and bait raiser will stand upright on the bottom of a lake or river and hold the baited hook above stones and short weeds where fish can see the bait. This also prevents live bait from crawling under stones or weeds and generally displays the bait in a nature-like manner resembling a creature, such as a bug or minnow, nibbling on the end of a weed. The combined sinker and bait raiser is especially advantageous when fishing close to the bottom in deep water as the hook can be reeled in to within a short distance of the rod-tip without any interferenece by parts on the line, as would be the case if a bobber on the surface of the water would be used to hold the bait just off the bottom in deep water.

Another object of the present invention is the provision of means to anchor a baited hook to the bottom of a river and to hold the bait off the bottom, even in a moderate current.

A further object of the invention is to provide neat, simple and convenient assembling means for a casting weight, sinker, bobber or combined sinker and bait-raiser with a hookleader and fishing line.

Another object of the invention is to provide neat, simple and handy means on an assembly-member for attaching one end of a hookleader directly to the end of a fishing line, whereby line tension is transmitted directly from the leader to the line without exerting a tension transmitting strain on members of the assembly-body.

A further object of the invention is the provision of means whereby one single line knot securely connects 3 parts: 1. The loop end of a hookleader; 2. The assembly body; 3. The end of the fishing-line.

Another object of the invention is to combine a leader retaining means with a reinforcement for a line aperture in the assembly-body, whereby the loop-end of a hookleader can simply be hooked to said leader retaining means and the tension exerted on the leader is directly transmitted to the fishing line by the one piece aperture-reinforcement and leader retaining means.

A further object of the invention is to provide a directional leader support for the connective portion of a wiry but flexible hookleader to hold a baited hook near the possible maximum distance above the bottom of a body of water.

A further object of the invention is to provide an assembling body having a leader enclosure which neatly encloses the looped connective end of a hook-leader.

A further object of the invention is to provide a leader enclosure in a combined fishing weight and assembly body which is adapted to hold a connective leader portion in a constant direction relative to the body and a leader retainer, regardless of the relative position of the long leader portion beyond the body.

Another object of the invention is to prevent continuous rubbing of the hookleader against the back end of the assembly-body when the leader repeatedly swings back and forth in the current of a river or while trolling a bait in a lake.

The assembly-body can be made of cork, foam-plastic, wood or other buoyant material to provide a bobber or float. An assembly-body of glass or transparent plastic provides a casting weight and slowly sinking sinker well adapted to repeatedly cast out and retrieve small artificial lures on the end of a thin flexible leader. Lead in the form of the described assembly-body makes an improved sinker suitable for trolling, casting and still fishing. The combination of a buoyant body with a sinker in the manner described serves as a combined sinker and bait-raiser.

Different forms and sizes of the described assembly-body can be manufactured for the various fishing conditions and different fishing methods.

With these and other objects in view, the invention consists in features of construction, combinations and arrangements of parts as will be hereinafter more fully described in detail, illustrated in the accompanying drawing which discloses the preferred embodiments of the invention, and pointed out in the claims hereunto appended.

Figure 1 illustrates a combined casting weight, sinker and bait raiser comprising a float with a sinker on the lower end thereof. The bait raiser is shown in longitudinal midsection taken as indicated by the lines, arrows and numerals 1 in Figure 3. The sectional view discloses the combined leader passageway and leader enclosure. An optional leader retainer is shown within the sinker.

Figure 2 is an end view of the same bait raiser.

Figure 3 is a top view of the bait raiser.

Figure 4 is a bottom view of the bait raiser.

Figure 5 is a fragmentary longitudinal mid-sectional view similar to Figure 1 but the optional leader retainer is omitted and the connective end of the hookleader is shown tied directly to the fishing line and to the attaching means for the fishing line on the sinker portion of the bait raiser.

Figure 6 is a modified form of the same basic structure, shown in longitudinal mid-section, as indicated by the lines, arrows and numerals 6 in Figure 7. The illustrated body may be made of sinking material to provide a combined assembly member casting weight and sinker. An optional leader retaining means is illustrated in the line attaching end of the body.

Figure 7 is a bottom view of the fishing weight and assembly member.

Figure 8 is a cross-section through the casting weight taken as indicated in Figure 6 by the lines, arrows and numerals 8.

Figure 9 is another cross-section through the same body, taken as indicated by lines, arrows and numerals 9 in Figure 6.

In Figure 1 of the drawing the numeral 1 indicates an inherently buoyant body, of foam-plastic or other suitable material such as cork or wood. A sinker 2, preferably of lead, and the buoyant body 1 are secured to each other by means of cement and by an interlocking recess and projection 3 provided thereon. The buoyancy of the buoyant upper body portion 1 is adequate to hold the same in an upright position above the sinker portion 2 when the latter rests on the bottom of a body of water. A line attaching means, comprising a line-aperture 4 for a fishing line 5, is provided on an extended portion 6 of the bait raiser. A combined leader passageway and leader enclosure 7 perforates the assembly-body 1, 2 from top to bottom. The upper end of the passageway-wall forms a leader support 15 to direct an inserted hook leader 8 upward with the cooperation of the buoyancy of the float 1. A passageway extension in the form of a slot 9, formed in the bottom of the body, extends from the line-aperture 4 across and past the lower open end of the leader passageway 7 as shown in the drawing. A combined aperture reinforcement and leader retainer is formed with a line-eyelet, sleeve and insert 10 at one end thereof. It may be made of a piece of wire, a portion of which forms a coil 10 fitting into the line aperture 4. An extended portion of the sleeve and insert 10 is disposed in the adjacent leader passageway portion 9 and extends past and across the open lower end of the leader enclosure 7 to form a leader retainer 11, having a return bend or hook, as illustrated in the drawing. The line attaching means also comprises a small line-groove 12 formed in the leading portion of the sinker. The contour of the extended sinker portion 6 diverges from the line-groove 12 towards the main body to form a V-shaped weed deflector. The upper end of the leader passageway 7 opens in a flared arc of a comparatively large radius to form a bellmouthed bending form 14 for the emerging hook leader portion 8. Adjacent the base of the bending form the flexible foam plastic forms a soft resilient clasp means 15 therein, adapted to receive circum-restrict[ed] and [a] clasp a portion of the hookleader 8. This narrow but resilient passageway portion 15 forms a leader support holding the emerging leader portion in an upright position to direct the free remainder of the wiry hookleader upward. This passageway clasp 15 also holds the enclosed connective leader portion taut against the leader retainer 11. For fishing in rivers having considerable current it is preferable to use a combined sinker and bait-raiser of generally streamlined cross-section as shown in Figure 3. The generally streamlined shape cuts down drag and the long narrow sinker base positioned in line with the waterflow gives the bait-raiser a better footing. A considerable portion of the sinker body 2 is off-set toward the leading end 6 of the body-assembly. A comparatively wide and flat upper pressure-face 18 on the sinker slants downward toward the extended leading end thereof. Water-flow against this slanted face 18 results in downward pressure being applied to the face 18 to thereby force the leading end 6 down toward the bottom. This downward pressure combined with the off center position of the extended sinker portion 6 counteracts water drag on the upper body portion. Anchorhooks 19 may be provided on the bottom of the bait-raiser to increase the resistance to water current. A substantially V-shaped hook-leader-groove and slit 16 formed in the trailing top portion of the body is in line with the generally streamlined configuration of the body and consequently is also in line with the direction of waterflow. In moderate water current the drag exerted on the baited hook 17 and on the hookleader 8 will pull a light flexible leader down into the V-groove and slit 16 and so prevents the leaders from rubbing on the body when the trailing leader swings back and forth in the water current, *which* [what] in turn would weaken the leader.

The connective end of a flexible hookleader 8 inserted in the leader passageway and leader enclosure 7 can be secured to the body 1, 2 and to the fishing line 5 in at least three ways. One simple method is to draw the fishing line 5 through a leader-loop 13 provided on the connective end of the hookleader 8 and also through the line aperture 4 in the body and then tie a line-knot, as illustrated in Figure 5. The three parts are thus quickly and securely assembled by tying only one single knot. For fishing methods requiring frequent bait and leader changes an optional leader retainer 11 is provided. The latter makes it possible to simply hook and unhook a leader-loop to and from the body and fishing line. The loop-end 13 of a hookleader 8 is simply pushed from top to bottom through the leader passageway 7 and is then hooked on the extension 11 of the eyelet and aperture reinforcement 10. Leader tension is thus transmitted directly from the leader to the fishing line by means of the combined one piece eyelet and leader retainer. The substantially tubular aperture reinforcement 10 prevents the fishing line from cutting through the material which forms the line aperture. A third way of attaching the hookleader 8 and the fishing line 5 to the assembly *member* [memmer] 1, 2 is to tie each one separately to the body through the line aperture 4.

Modified form

The features described above are also incorporated in the fishing weight and assembly member illustrated in Figures 6, 7, 8, and 9. The looped end 20 of a hookleader 21 is enclosed in a passageway and leader enclosure 22 perforating a body 23 longitudinally. At the trailing end of the fishing weight a recess 24 retains a soft insert 25, which forms a flared bell-mouthed bending form 26 for the emerging leader portion. At the base of the bending form the piece of soft resilient material 25 forms the trailing end portion 27 of the leader passageway. This soft resilient body member 25 is adapted to receive, circum-restrict, clasp, and retain the inserted leader portion in the narrow passageway portion formed therein. To lower manufacturing cost and to facilitate passage of the hook-leader, the intermediate portion of the leader passageway 22 has the form of a longitudinal narrow slot 28 opening through one side of the body 23. Adjacent to the leading end of the body the leaderloop 20 is completely enclosed within the leading end of the leader enclosure 22 as shown in Figures 6 and 9 of the drawing. A line aperture 29 for a fishing line (not shown) perforates one side-wall of the body 23 and communicates with the passageway 22 at the leading end thereof. A clearance slot 30 is provided in the lower wall of the body across from the line-aperture to eliminate obstruction to the passage of the fishing line through the line-aperture. The looped end 20 of a hookleader 21 in the passageway 22 may be tied to the leading end of the body as described before and as shown in Figure 5. The fishing weight also has a combined aperture reinforcement sleeve 31 fitting into the line-aperture and a leader retainer 32, substantially as described before. The leader retaining means incorporated in the body near the leading end of the passageway 22 includes a member forming a hook and saddle 32 adapted to have the looped end 20 of a hookleader in the passageway hooked thereto. The soft resilient clasp means 25 embodied in the trailing portion of the body cooperates with the leader retainer in that it prevents relative forward movement of the enclosed leader portion, *which* [what] in turn prevents disengagement of the leader-loop 20 from the leader retainer 32. The enclosed leader portion is circum-restricted in the trailing body-end and is also held in a constant direction relative to the body and leader retainer, even when a long remainder of the hookleader is doubled back over the outside of the fishing weight, as during the casting flight. The leading end of this modified form also has a small line-groove 33 and forms a V-shaped weed deflector 34.

While I have described my invention in detail in the present preferred embodiments, it will be obvious to those skilled in the art that various changes and modifications may be made therein without departing from the spirit or scope thereof. I aim, in the appended claims, to cover such modifications and changes.

What I claim is:

1. A combined fishing device and assembly member for a fishing line and a flexible hookleader formed with a looped end, comprising a body having a passageway extending therethrough adapted to receive a portion of the hookleader including the looped end thereof with the remainder of said hookleader protruding beyond one end portion of said body, said passageway having the end thereof through which the hookleader emerges flared into a bell-shaped bending form, means provided for the attachment of the looped end of the hookleader and the fishing line to the end of said body opposite to that through which the hookleader emerges, said [elongated] body being composed of both buoyant and non-buoyant material, said buoyant material comprising the end portion through which the hookleader emerges while said non-buoyant material comprises the end portion for attachment of the hookleader and fishing line, an anchor hook on the non-buoyant material, and an inclined water current engaging surface on said body slanting downwardly toward the line-attaching means against which water may react to force said anchor downwardly.

2. A combined fishing weight and assembly member for a fishing line and a flexible hookleader with a looped end, comprising a body having a passageway extending therethrough adapted to receive a portion of the hookleader including the looped end thereof with the remainder of said hookleader protruding beyond one end portion of said body and with the latter end portion circum-restricting the inserted leader portion, said body having an aperture in the end thereof opposite to that through which said remainder of the hookleader emerges, and a combined aperture-reinforcing sleeve and hookleader retainer arranged to fit inside said aperture and to extend across said passageway, respectively, so that a fishing line may be tied to said body through said reinforcement and whereby the looped end of the hookleader may be passed over the leader retainer to secure the hookleader thereto.

3. A combined fishing weight and assembly member for a fishing line and a flexible hookleader, comprising a body having a line-aperture formed in the normal leading end thereof to tie the end of a fishing line thereto and having a leader passageway formed therein which extends lengthwise therethrough from said line-aperture to the opposite trailing body-end, said leader passageway being adapted to receive the connective end portion of the hookleader with the remainder of the hookleader protruding beyond said trailing body-end and with the trailing body end circum-restricting the inserted leader portion, the end of the passageway at the trailing end of the body being flared to form a bell-mouthed bending form for the emerging leader portion, and said line-aperture being formed to communicate with the adjacent end of said passageway so that the connective end of the hookleader in the passageway may be tied to the leading end of the body.

4. A combined fishing weight and assembly member for a fishing line and a flexible hookleader with a looped end, comprising a body having a line-aperture formed in the normal leading end thereof to tie the end of a fishing line thereto and having[,] a leader passageway extending lengthwise therethrough from said line-aperture to the opposite trailing body-end, said leader passageway being adapted to receive the connective end portion of the hookleader including the looped end thereof with the remainder of the hookleader protruding beyond said trailing body-end and with the trailing body end circum-restricting the inserted leader portion, the end of the passageway at the trailing end of the body being flared to form a bellmouthed bending form for the emerging leader portion, and said line-aperture being formed to communicate with the adjacent end of said passageway so that the end portion of a fishing line may be passed through said line-aperture and through said looped end of the hookleader in the passageway to secure said hookleader and fishing line to the body.

5. A combined fishing weight and assembly member for a fishing line and a flexible hookleader with a looped end, comprising a body having a line-aperture formed in the normal leading end thereof to tie the end of a fishing line thereto and having a leader passageway extending lengthwise therethrough from said line-aperture to the opposite trailing body-end, said leader passageway being adapted to receive the connective end portion of the hookleader including the looped end thereof with the remainder of the hookleader protruding beyond said trailing body-end and with the trailing body end circum-restricting the inserted leader portion, the end of the passageway at the trailing end of the body being flared to form a bellmouthed bending form for the emerging leader portion, said line-aperture being formed to communicate with the adjacent end of said passageway, and a leader retainer comprising a combined eyelet and insert arranged to fit inside said aperture, a fishing line having an end portion normally tied to the leading end of the body by passing the same through said eyelet-insert and aperture, a member of the leader retainer being positioned adjacent the leading end of the passageway and adapted to have the looped end of the hookleader in the passageway quickly hooked thereto and unhooked therefrom.

6. A combined fishing weight and assembly member for a fishing line and a flexible hookleader with a looped end, comprising a body having a line-aperture formed in the normal leading end thereof to tie the end of a fishing line thereto and having a leader passageway extending lengthwise therethrough from said line-aperture to the opposite trailing body-end, said leader passageway being adapted to receive the connective end portion of the hookleader including the looped end thereof with the remainder of the hookleader protruding beyond said trailing body-end and with the trailing body end circum-restricting the inserted leader portion, the end of the passageway at the trailing end of the body being flared to form a bellmouthed bending form for the emerging leader portion, said line-aperture being formed to communicate with the adjacent end of the passageway, and a combined aperture insert and leader retainer comprising a wire member, a portion of said wire member forming a coil fitting inside said line-aperture and another portion of said wire forming a leader retainer and being positioned adjacent the leading end of the passageway and adapted to have the looped end of the hookleader in the passageway quickly hooked thereto and unhooked therefrom.

7. A combined fishing weight and assembly member for a fishing line and a flexible hookleader with a looped end, comprising a body having a line-aperture formed in the normal leading end thereof to tie the end of a fishing line thereto and having a leader passageway extending [lengthwise there] through [from said] [line-aperture to] the [opposite] trailing body-end, said leader passageway being adapted to receive the connective end portion of the hookleader including the looped end thereof with the remainder of the hookleader protruding beyond said trailing body-end, a resilient body member forming a portion of the leader passageway and being adapted to receive, clasp and retain a portion of the hookleader, and a leader retainer incorporated in said body adjacent the leading end of the passageway and adapted to be inserted in the looped end of said hookleader to retain the latter in said passageway, said resilient body member being adapted to cooperate with the leader retainer to resist lengthwise movement of the inserted hookleader and thus preventing disengagement of said looped end from the leader retainer.

8. A combined fishing weight and assembly member for a fishing line and a flexible hookleader with a looped end, comprising a body having a line-aperture formed in the normal leading end thereof to tie the end of a fishing line thereto and having a leader passageway extending [lengthwise there] through [from said] [line aperture to] the [opposite] trailing body-end, said leader passageway being adapted to receive the connective end portion of the hookleader including the looped end thereof with the remainder of the hookleader protruding beyond said trailing body-end, a resilient body member forming the trailing end portion of the passageway and being adapted to receive, clasp and retain a portion of the hookleader, and a leader retainer incorporated in said body adjacent the leading end of the passageway forming a saddle adapted to be inserted in the looped end of said hookleader to retain the latter in position, said resilient body member being adapted to cooperate with the leader retainer to resist lengthwise movement of the inserted hookleader and thus preventing disengagement of said looped end from the leader retainer.

9. A combined fishing weight and assembly member for a fishing line and a flexible hookleader with a looped end, comprising a body having a line aperture formed in the normal leading end thereof to tie the end of a fishing line thereto and having a leader passageway extending [there] through [from said line aperture] [to] the [opposite] trailing body-end, said leader passageway being adapted to receive the connective end portion of the hookleader including the looped end thereof with the remainder of said hookleader protruding beyond said trailing body-end, a resilient body member forming the trailing end portion of the passageway and being adapted to receive, clasp and retain a portion of the hookleader in position, and a leader retainer incorporated in said body adjacent the leading end of the passageway, said leading end of the passageway being adapted to enclose the looped end of the inserted hookleader in a plane transverse thereto with a portion of said leader retainer extending across said leading end of the passageway in such a manner that said looped end of the hookleader in the passageway may be hooked thereto and unhooked therefrom, and said resilient body member cooperating with the leader retainer to resist lengthwise movement of the inserted hookleader and thus preventing disengagement of said looped end from the leader retainer.

10. A combined fishing weight and assembly member for a fishing line and a flexible hookleader with a looped end, comprising a body having a line aperture formed in the normal leading end thereof to tie the end of a fishing line thereto and having a leader passageway extending [lengthwise] therethrough [from] [said line aperture] to the [opposite] trailing body-end, said leader passageway being adapted to receive the connective end portion of the hookleader including the looped end thereof with the remainder of the hookleader protruding beyond said trailing body-end, a resilient body member forming the trailing end portion of the passageway and being adapted to receive, clasp and retain a portion of the hook-leader in position, said passageway having the form of an open slot intermediate said line aperture and said resilient body member, and a leader retainer incorporated in said body adjacent the leading end of the passageway and forming a saddle adapted to be inserted in the looped end of said hookleader to retain the latter in position, and said resilient body member cooperating with the leader retainer to resist lengthwise movement of the inserted hookleader and thus preventing disengagement of said looped end from the leader retainer.

11. A combined fishing weight and assembly member for a fishing line and a flexible hookleader, comprising a body having a line-aperture formed in the normal leading end-portion thereof to tie the end of a fishing line thereto and having a leader passageway extending [lengthwise] therethrough [from a point near] [said line-aperture] through the [opposite] trailing body-end, said passageway being adapted to receive a connective portion of the hookleader with the remainder of the hookleader protruding beyond said trailing body-end, and an aperture-reinforcing sleeve arranged inside said line-aperture in such a manner that a fishing line may be tied to the leading end portion of said body through said sleeve in the line-aperture, an extended portion of the sleeve material also forming a hookleader-retainer adapted to have a looped end of the hookleader in the passageway hooked thereto.

12. A bait raiser comprising a float of buoyant material, a sinker secured to one end of said float, the buoyancy of the float holding the latter above the sinker when the bait raiser is at rest on the bottom of a body of water, said sinker having a line-aperture therein constituting an attaching means for a fishing line, said bait raiser having a combined leader passageway and leader enclosure formed within and extending therethrough, one end of said leader passageway opening through the surface of the float at the upper end thereof opposite the sinker, the other and lower end of said leader passageway opening through the surface of the bait raiser near said line-aperture in the sinker, and a leader retainer, one end portion of the leader retainer forming a combined eyelet and insert fitting inside said line-aperture in the sinker and being adapted to have a fishing line tied therethrough, the remainder of said leader retainer being associated with said lower end of the leader passageway, the connective end portion of a wiry flexible hookleader normally being inserted in said leader enclosure with the remainder of the hookleader extending beyond the upper end of the bait raiser and carrying a fish-hook on the free end thereof, the connective end portion of the hookleader forming a loop, said remainder of the leader retainer being adapted to be inserted in said leader loop, and the upper end of said float being formed to circum-restrict the inserted leader portion and constituting a directional leader support to direct the emerging leader portion upward with the cooperation of the buoyancy of the float.

13. A combined fishing weight and assembly member for a fishing line and a flexible hookleader, comprising a body having a line-aperture formed in the normal leading end-portion thereof to tie the end of a fishing line thereto and having a leader retaining means incorporated in the leading end-portion of said body, said body also having a leader passageway extending [lengthwise therethrough] [from a point near said leader retaining means] through the [opposite] trailing body-end, said passageway being adapted to receive a connective portion of the hookleader with the remainder of the hookleader protruding beyond said trailing body-end which is formed to circum-restrict the inserted leader portion, and said leader retaining means being adapted to have a looped end of the hookleader in the passageway hooked thereto, and said leader passageway cooperating with the leader retaining means to hold the connective leader portion therein in a constant relative direction regardless of the relative direction of the long trailing leader portion beyond the body.

14. A combined fishing weight and assembly member as set forth in claim 13 wherein said body has a piece of soft resilient material mounted therein which forms the trailing end portion of the passageway, said resilient material being adapted to clasp and retain the inserted leader portion to resist relative longitudinal movement of the latter and to hold the retained leader portion within the body taut to prevent disengagement of the leader-loop from the leader retaining means.

(References on following page)

References Cited in the file of this patent or the original patent

UNITED STATES PATENTS

| | | |
|---|---|---|
| 473,503 | Herring | Apr. 26, 1892 |
| 685,263 | Decor | Oct. 29, 1901 |
| 786,597 | Picken | Apr. 4, 1905 |
| 952,615 | Harkins | Mar. 22, 1910 |
| 1,497,019 | Hennings | June 10, 1924 |
| 1,512,656 | Ward | Oct. 21, 1924 |
| 1,543,206 | Doering | June 23, 1925 |
| 1,906,495 | Stine | May 2, 1933 |
| 2,097,536 | Shirk | Nov. 2, 1937 |
| 2,143,942 | Gruenhagen | Jan. 17, 1939 |

| | | |
|---|---|---|
| 2,196,620 | Attarain | Apr. 9, 1940 |
| 2,221,437 | Allison | Nov. 12, 1940 |
| 2,239,934 | Ruiz | Apr. 29, 1941 |
| 2,250,038 | Sink | July 22, 1941 |
| 2,397,030 | Mercier | Mar. 19, 1946 |
| 2,495,572 | Deutsch | Jan. 24, 1950 |
| 2,534,790 | Moore | Dec. 19, 1950 |
| 2,712,197 | Lewis | July 15, 1955 |

FOREIGN PATENTS

| | | |
|---|---|---|
| 534,101 | France | Mar. 18, 1922 |
| 610,687 | France | Sept. 10, 1926 |
| 899,860 | France | June 13, 1945 |